L. O. ANDERSON.
CHICKEN FEEDER.
APPLICATION FILED JULY 12, 1917.
1,275,194.
Patented Aug. 13, 1918.
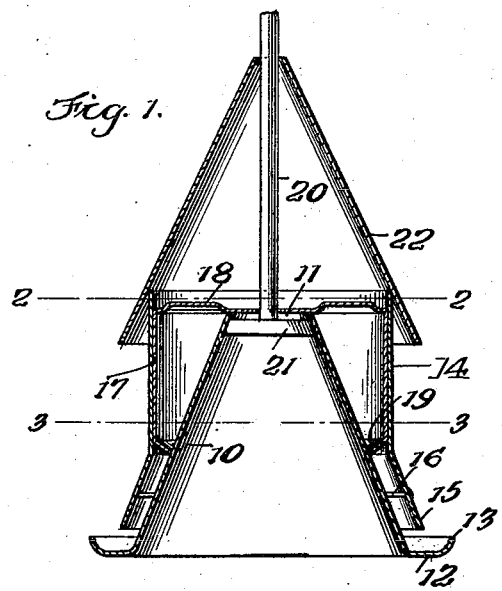
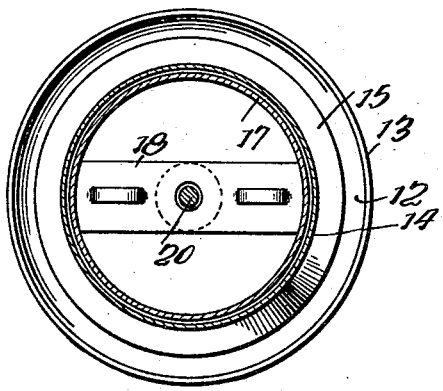
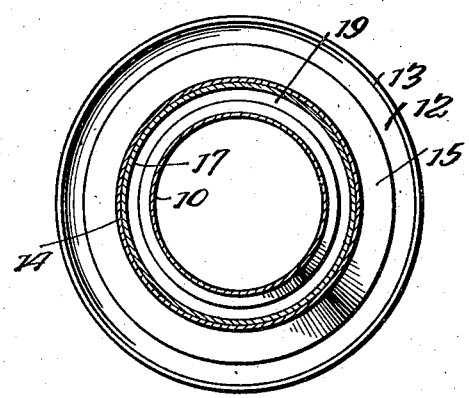
Inventor
Louis O. Anderson
Witness
By
Attorney

UNITED STATES PATENT OFFICE.

LOUIS O. ANDERSON, OF BRUNSWICK, MINNESOTA.

CHICKEN-FEEDER.

1,275,194.   Specification of Letters Patent.   Patented Aug. 13, 1918.

Application filed July 12, 1917. Serial No. 180,200.

*To all whom it may concern:*

Be it known that I, LOUIS O. ANDERSON, a citizen of the United States, residing at Brunswick, in the county of Kanabec and State of Minnesota, have invented certain new and useful Improvements in Chicken-Feeders, of which the following is a specification.

This invention has relation to poultry feeding devices, and the nature and objects thereof will be readily apparent to those skilled in the art to which it appertains, in the light of the following explanation of the accompanying drawings, illustrating what I now believe to be the preferred embodiment or mechanical expression of my invention, from among other forms and arrangements within the spirit of the invention, or the scope of the appended claims.

However an object of the invention is to provide a poultry feeding device embodying means for supplying any desired quantity of feed from a main source of supply, and for automatically cutting off further supply after the allotted quantity has been consumed.

Another object of the invention is to provide a poultry feeding device which is adapted to be suspended for oscillation within reach of the poultry whereby the possibility of knocking over the device or spilling the food is obviated.

A still further object of the invention is to provide a poultry feeding device of an extremely simple construction, permitting the device to be readily taken apart for cleaning or repairing the same.

In addition to the foregoing this invention comprehends improvements in the details of construction and arrangement of parts to be hereinafter described and particularly set forth in the appended claims.

In the accompanying drawings in which like and corresponding parts are designated by the same reference characters throughout the several views in which they appear:—

Figure 1 is a view in vertical section of a poultry feeding device constructed in accordance with my invention and Figs. 2 and 3 are transverse sections respectively taken on the lines 2—2 and 3—3 of the preceding figure.

With reference to the drawings, 10 indicates a hollow substantially conical drum member of sheet metal having an opening 11 in its frustum, and its lower periphery extended horizontally and radially to form an annular flange 12 having its edge curved upward as at 13 to form a feeding trough. A cylindrical casing member 14 is encompassed about the upper portion of the conical member with the lower portion flared outwardly as at 15 to extend parallel to the surface of the conical member but in spaced relation thereto, with the lower edge of said flared portion spaced from the bottom of the trough. Rivets or the like 16 may serve to connect the members together.

A feed regulating device is provided which is in the nature of a hollow cylinder 17 of sheet metal, open at each end and having a strip 18 extended diametrically across the upper end thereof. The lower end of the member 17 is bent inward and downward as at 19 to tightly engage the conical member when said feed regulating device is at its lowermost position. The device is suspended by means of a rod 20 which extends through an aperture in the cross piece 18. Rod 20 depends into the conical member 10 and said member loosely hangs on a head 21 of the rod inasmuch as the head is of greater diameter than the frustum opening of member 10 and accordingly is impassable through the said opening. The upper end of the rod may be provided with an eye whereby the rod may be supported from any convenient object. A cover is provided in the nature of a conical member 22 having its apex apertured to receive the rod, said member engaging its base portion over the casing member as indicated.

It will be noted that the feed regulating device is nearly as long as the cylindrical portion of the casing. In operation therefore, the feed is poured into the feed regulating device from the top after raising the conical cover 22 for that purpose.

A very important feature is the wall or skirt 15 inasmuch as it prevents poultry from interfering with the valve, thus overcoming undesired operation of the valve so as to render the automatic regulating feature practical.

To feed the material, the feed regulating device is raised by means of the cross piece, whereupon the feed falls by gravity through the space between the conical member 10 and the flared portion 15, and the feed regulating device is released. As the material is taken from the trough, more falls from the source of supply to replace it. However, during this automatic feeding, the feed regulating device gradually works its way downward until its inwardly directed portion 19 engages the cone member 10 whereupon further supply of material to the trough is cut off. Obviously, if the feed regulating device is initially raised to its highest point, a maximum amount of material will descend before the regulating device reaches its lowermost point; and conversely, if the regulating device is raised but slightly only a small quantity of material will descend because the regulating device will reach its lowermost point more quickly.

Having thus described my invention what I claim as new and desire to secure by Letters Patent is:—

1. A feeder having a container member, a drum spaced therefrom and fixed relatively thereto, means movable through and by the material within the container at a rate proportional to the rate at which the material is removed to thus cut off the supply of material, and means projecting below the first mentioned means to prevent interference by those fed with automatic action of the first mentioned means.

2. A feeder having a container member, a drum member therein spaced therefrom, one of said members having a substantially inclined wall, a dispensing means movable intermediate the container member and drum member relatively to said wall, and one of said members having means to prevent interference by those fed with the dispensing means.

3. A feeder having a container member, a drum member therein spaced therefrom, a dispensing means freely movable intermediate the container member and drum member, said dispensing means having a laterally extending wall to sustain the weight of the material and contact with one of the members to cut off the supply of material, and means for manual operation of the dispensing means to dispose the dispensing means at different locations.

4. A feeder having a container, a dispensing means manually and freely movable therein from a location above its outlet for disposition at different distances from its outlet, said dispensing means sustaining material within the container and being movable automatically by the weight thereof at a rate proportional to the rate at which the material is dispensed, to close the outlet and means to prevent interference by those fed with the dispensing means.

5. A feeder having a container, a drum in fixed relation therewith and spaced therefrom, a feeding trough extending outwardly from the drum at its base, dispensing means intermediate the drum and container to contact with one of the first two mentioned parts, and a skirt to prevent interference by those fed depending from the container and terminating short of the trough to permit access thereto.

6. A feeder having a substantially conical drum provided with an outwardly extending trough adjacent its base, a container surrounding and spaced from the drum, a dispensing means movable vertically intermediate the drum and container, said dispensing means having an inwardly extending wall to contact with the exterior of the drum, said container having a skirt extending below the dispensing means and terminating short of the trough to permit access thereto, means to suspend the drum, and a handle for the dispensing means through which the suspending means passes.

In testimony whereof I affix my signature in the presence of two witnesses.

LOUIS O. ANDERSON.

Witnesses:
 AND. SKOGLUND,
 L. P. SKOGLUND.

Copies of this patent may be obtained for five cents each, by addressing the "Commissioner of Patents, Washington, D. C."